May 13, 1941.     F. J. LAPOINTE     2,242,036
BROACH
Filed May 24, 1939
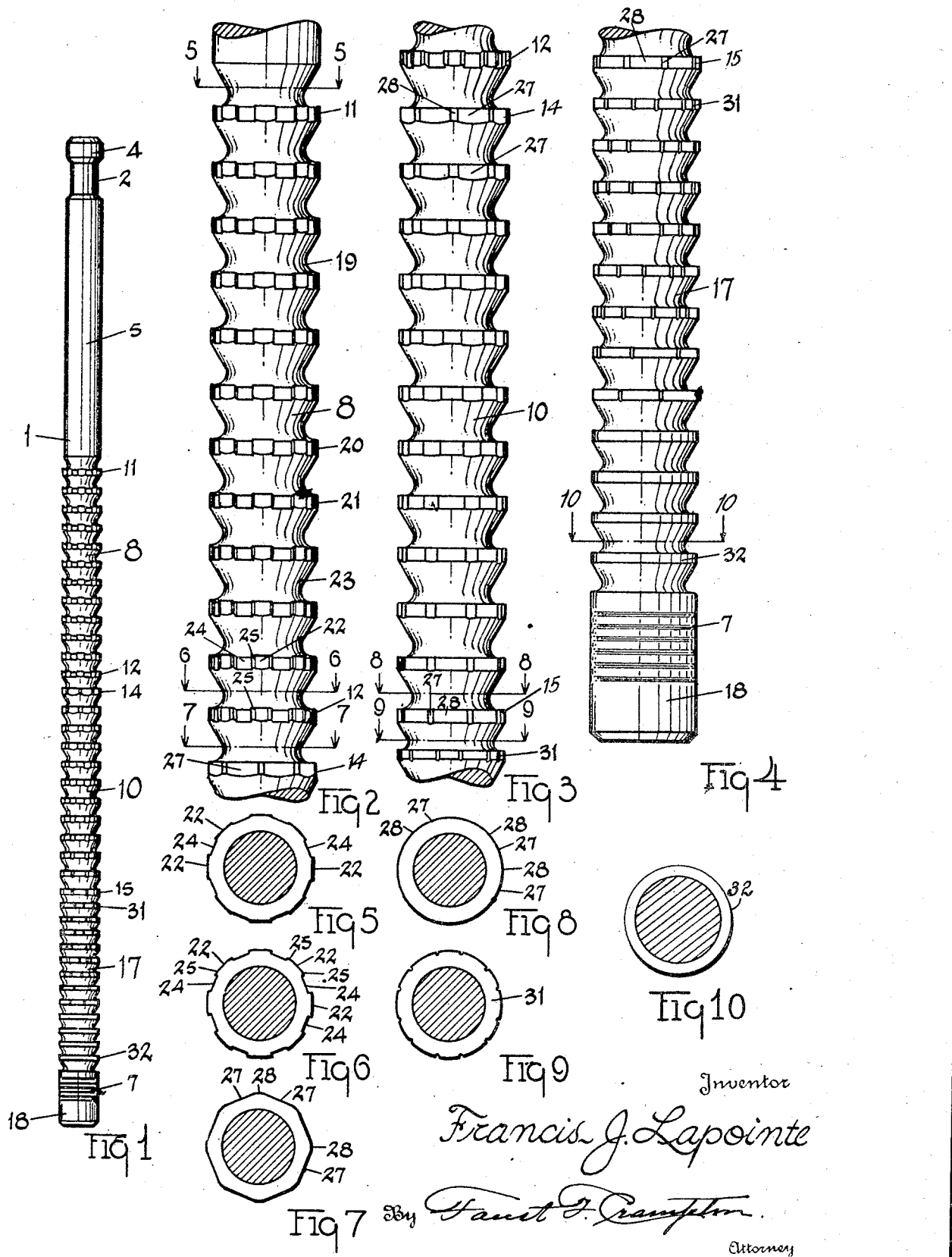
Inventor
Francis J. Lapointe
By Faust F. Crampton
Attorney Patented May 13, 1941

2,242,036

UNITED STATES PATENT OFFICE 2,242,036

BROACH

Francis J. Lapointe, Ann Arbor, Mich.

Application May 24, 1939, Serial No. 275,479

12 Claims. (Cl. 29—95.1)

My invention has for its object to provide a broach having teeth formed to enable a marked reduction in tooth length and a marked reduction in the power required to broach-cut work of a given length. Heretofore, to broach-cut a concave cylindrical surface, having a length of 8 inches, required a broach-cutting section having a length of four to six times the length of the cutting section of the broach embodying my invention, and the power required to perform the same broach-cutting results on the work, was twice that required to operate the broach embodying my invention.

The invention provides a broach having two sets of teeth, one following the other with respect to the movement of the broach when broach-cutting the work, the teeth having straight cutting-edge portions spaced from each other. The straight cutting edge portions of one set are located in substantial alignment with the spaces between the straight cutting-edge portions of the other set to produce, by the first set, a plurality of channels and ridges that are, subsequently, broach-cut by the straight cutting-edge portions of the second set.

The relatively short or spaced straight cutting-edge portions reduce the resistance of the chip formation, by reason of the removal of plane ribbons of the metal that readily shape themselves into separated curls within the chip spaces between the teeth. The pulling pressure required is greatly reduced by the use of the spaced, straight cutting-edge portions that, first, form channels in the work and, subsequently, cut the ridges. Where certain of the teeth of the second set of the broach are polygonal in form, the straight cutting-edge portions of the teeth extend into the channels formed by the straight cutting-edge portions of the first set and prevent drifting of the broach. Where it is desired to form rounded corners, the straight cutting-edge portions of the second set are separated by curved cutting-edge portions that move in the channels in the work formed by the first set of teeth. This, also, prevents drifting of the broach while the surface parts of the holes in the work are finished in substantially prismatic form separated by narrow curved surface parts. To form cylindrical surfaces, the curved cutting-edge portions of the second set may be, if desired, progressively increased in length until the cylindrical surface is formed by cutting the flat surfaces by the last of the teeth of the second set.

Thus, the straight cutting-edge portions of practically all of the teeth form flat shavings and eliminate the loss of the power produced by forcing curved metal, removed by teeth having curved cutting-edge portions, into a smaller radius and a greater curvature in the planes of the cutting edges of the teeth and, also, forcing the curved metal into a curved form in the plane of the axis of the broach by the surfaces of the broach that form the chip spaces.

The invention consists in other features, which will appear from the following description and upon examination of the drawing forming a part hereof. The tooth structure and arrangement of parts of each tooth of the broach may be varied, and the arrangement of the parts of certain of the teeth with respect to parts of other of the teeth may, likewise, be varied without departing from the invention as presented in the claims. The particular broach selected as an example of an embodiment of the invention is shown in the accompanying drawing.

Fig. 1 illustrates a broach containing the invention. Figs. 2, 3 and 4 illustrate parts of the broach shown in Fig. 1, somewhat enlarged, wherein the forms of the teeth more clearly appear. Fig. 5 illustrates a view of a section of the broach taken on the plane of the line 5—5 indicated in Fig. 2. Fig. 6 illustrates a view of a section taken on the plane of the line 6—6 indicated in Fig. 2. Fig. 7 illustrates a view of a section taken on the plane of the line 7—7 indicated in Fig. 2. Fig. 8 is a view of a section taken on the plane of the line 8—8 indicated in Fig. 3. Fig. 9 is a view of a section taken on the plane of the line 9—9 indicated in Fig. 3. Fig. 10 is a view of a section, taken on the plane of the line 10—10, indicated in Fig. 4.

In the form of broach illustrated in Fig. 1, the broach 1 is provided with the usual channel 2 and head 4 located on the upper end of the shank 5 to enable connection of the broach in a suitable pull-head of a broaching machine. If desired, the broach may be provided with a plurality of burnishing beads 7.

The cutting section of the broach, shown in Fig. 1, has three sets or forms of teeth and is formed of two parts 8 and 10. The part 8 begins with the tooth 11 and ends with the tooth 12. The part 10 begins with the tooth 14 and ends with the tooth 15. The broach is, also, provided with the usual finishing and sizing section 17, and the tail 18 of the broach may be provided with the burnishing beads 7.

The part 8 of the cutting section of the broach has two sets of teeth, one set 19 begins at the tooth 11 and ends with the tooth 20 and the next set 23 begins with the tooth 21 and ends with the tooth 12. The teeth of the part 8 of the section have straight cutting-edge portions 22 that are separated by channels 24. The height of the straight cutting-edge portions 22 progressively increase, while the bottoms of the channels 24 remain at substantially the same height from the axis of the broach and, consequently, the depth of the channels increase, as measured radially, in the following teeth with respect to the direction of movement of the broach while broach-cutting the work. The set 23 is provided with cutting-edge portions that are, likewise, separated by channels of progressively increasing depth. The set 23 of the teeth are provided with straight cutting-edge portions and differ from the teeth of the set 19 in that the straight cutting edge portions terminate, in each case, in circular cutting-edge portions. The straight cutting-edge portions progressively increase in height and decrease in length, while the curved circular cutting-edge portions progressively increase in length, the width of the channels 24 remaining substantially the same throughout the length of the part 8.

The part 8, thus, produces channels or spaced ridges in the work. The teeth 19 produce channels with flat bottoms and the teeth 23, which follow in the cutting operation, produce a central plane surface in the bottoms of the channels and curved or cylindrical surfaces along the opposite edges of the bottoms of the channels.

The part 10 of the broach extends from the tooth 14 to and including the tooth 15. The part 10 has a set of teeth that are each provided with straight cutting-edge portions 27 that are separated from each other by circular cutting-edge portions 28. The centers of the straight cutting-edge portions 27 are located substantially in alignment with the centers of the channels 24 of the part 8, while the centers of the circular cutting-edge portions 28 are located substantially in alignment with the centers of the straight cutting-edge portions of the teeth of the part 8 of the broach. Thus, in the broach operations, the ends of the straight cutting-edge portions 27 of the set of teeth of the part 10 of the broach and the curved cutting-edge portions enter the slots that are formed in the work by the straight cutting-edge portions 22 of the teeth of the part 8 as the straight cutting-edge portions 27 progressively cut the surfaces of the ridges. Since the ends of the straight cutting-edge portions 27 and the circular cutting-edge portions 28 are located in the channels formed in the work, the broach is held in axial alignment and "drifting" is prevented as the broach progresses through the work and the curved cutting edges of the part 10 extend the curved surfaces formed by the last of the teeth the set 23 of the part 8.

The height of the straight cutting-edge portions 27 progressively increases, that is, the shortest radial distance between the straight cutting-edge portions 27 to the axis of the broach progressively increases in the following sequential teeth of the set 10 of teeth of the broach with respect to the direction of the movement of the broach when broach-cutting the work. The height of the curved cutting-edge portions 28 approximates, or is but slightly less than, the height of the last of the straight cutting-edge portions of the part 8 and is but slightly increased from the leading to the following end of the said part 10. The length of the curved cutting-edge portions progressively increases and the length of the straight cutting-edge portions 27, correspondingly, decrease until the last tooth 15 of the part 10, wherein the straight cutting-edge portions 27 of the tooth very closely approximates the line of the circle of the curved cutting-edge portions 28. Thus, in the particular broach shown in the drawing, which is designed for the purpose of cutting and finishing cylindrical surfaces of holes in the work, the teeth progressively develop a circular cutting edge to form a surface having its axis accurately disposed with reference to the work.

The sizing section 17 of the broach begins with the tooth 31 and includes the tooth 32 having a substantially exact complete circular cutting edge, preferably, preceded, in the cutting operation, by two or three teeth, progressively, approximating the dimensions of the cutting tooth 32. The set of teeth of the sizing section 17 are of the type commonly used for finally shaping and sizing the surface that has been broach-cut by the tool. The beaded tail 18 of the broach is, also, of a type not unusual in the art for burnishing the surface that has been broach-cut.

I claim:

1. In a broach, a plurality of teeth; the teeth having straight cutting-edge portions and intermediate curved cutting-edge portions; and the straight cutting-edge portions progressively decreasing in length with respect to the engagement of the work by the teeth and the curved cutting-edge portions progressively increasing in length.

2. In a broach, a plurality of teeth comprising three sets; the teeth having straight cutting-edge portions; one set of teeth having channels separating the straight cutting-edge portions; a second set of teeth having curved cutting-edge portions located at the ends of the straight cutting-edge portions and channels located intermediate the said curved cutting-edge portions; a third set of teeth having curved cutting-edge portions separating the straight cutting-edge portions and located in alignment with the said channels; the said sets following in the order named with respect to the sequential engagement of the broach by the teeth; the straight cutting-edge portions of the first and second sets progressively increasing in height and the straight cutting-edge portions of the third set progressively increasing in height; and the first of the curved cutting-edge portions of the third set being substantially the same height as the straight cutting-edge portions of the last of the teeth of the second set and the straight cutting-edge portion of the first of the third set being substantially the same height as the first cutting-edge portions of the first set.

3. In a broach, a plurality of teeth; the teeth having straight cutting-edge portions terminating in curved cutting-edge portions; the straight cutting-edge portions progressively increasing in height and decreasing in length; and the curved cutting-edge portions progressively increasing in length with respect to the engagement of the work by the teeth.

4. In a broach, a plurality of sets of teeth; the teeth of each set having straight cutting-edge portions; a set of teeth having spaced straight cutting-edge portions; a set of teeth having curved cutting-edge portions located at the ends of the straight cutting-edge portions and spaced from each other; a set of teeth having curved cutting-edge portions separating the straight cutting-edge portions, the said sets following in the order named, with respect to the sequential engagement of the broach by the teeth; the straight cutting-edge portions of the teeth progressively increasing in height; and the curved cutting-edge portions progressively increasing in length.

5. In a broach, a pair of sets of teeth; the teeth having spaced, straight cutting-edge portions; and the centers of the straight cutting-edge portions of one set of the teeth located in alignment wtih the centers of the spaces between the ends of the straight cutting-edge portions of the other set of the teeth.

6. In a broach, a pair of sets of teeth; the teeth having spaced, straight cutting-edge portions; the centers of the straight cutting-edge portions of one set of the teeth located in alignment with the centers of the spaces between the ends of the straight cutting-edge portions of the other set of the teeth; and the straight cutting-edge portions of each of the said sets of the teeth progressively increasing in height with respect to the sequential engagement of the teeth with the work.

7. In a broach, a pair of sets of teeth; the teeth having spaced, straight cutting-edge portions; the centers of the spaced, straight cutting-edge portions of one set of the teeth located in alignment with the centers of the spaces between the ends of the straight cutting-edge portions of the other set of the teeth; the said other set of the teeth following the said one set of the teeth; and the straight cutting-edge portions of the said sets of teeth progressively increasing in height with respect to the sequential engagement of the teeth with respect to the work, the height of the last of the said one set of the teeth being greater than the height of the first of the said other set of the teeth.

8. In a broach, a pair of sets of teeth; the teeth having spaced, straight cutting-edge portions; the centers of the spaced, straight cutting-edge portions of one set of the teeth located in substantial alignment with the centers of the spaces between the ends of the straight cutting-edge portions of the other set of the teeth; the straight cutting-edge portions of the said one set and said other set of the teeth progressively increasing in height and the said other set of the teeth following the said one set of the teeth with respect to the sequential engagement of the teeth with the work; and the height of the first of the said one set of the teeth and of the said other set of the teeth being substantially the same.

9. In a broach, a pair of sets of teeth; the teeth having straight cutting-edge portions; one set of the teeth having channels located intermediate the ends of the straight cutting-edge portions; and parts of the straight cutting-edge portions of the other set of the teeth located substantially in alignment with the channels.

10. In a broach, a pair of sets of teeth; the teeth having straight cutting-edge portions; one of the sets of teeth having channels separating the straight cutting-edge portions of the said one set of the teeth and other set of the teeth having curved cutting-edge portions separating the straight cutting-edge portions of the said other set of the teeth; and the straight cutting-edge portions of the other set of the teeth located in substantial alignment with the channels, and the curved cutting-edge portions of the said other set of the teeth located in substantial alignment with the end parts of the straight cutting-edge portions of the said one set of the teeth.

11. In a broach, a pair of sets of teeth; the teeth having straight cutting-edge portions; one set of the teeth having channels separating the straight cutting-edge portions of the said one set of teeth; the other set of the teeth having curved cutting-edge portions separating the straight cutting-edge portions of the said other set of the teeth and located in substantial alignment with the straight cutting-edge portions of the said one set of the teeth; the said other set of the teeth following the said one set of the teeth with respect to the sequential engagement of the work by the teeth and the straight cutting-edge portions of the said one set and the said other set of the teeth progressively increasing in height; and the said straight cutting-edge portions of the said other set of the teeth progressively shortening as their heights are increased and the curved cutting-edge portions, correspondingly, increasing in length.

12. In a broach, a pair of sets of teeth; the teeth having straight cutting-edge portions; one set of the teeth having channels and curved cutting-edge portions located at the ends of the straight cutting-edge portions of the said one set of teeth; the other set of the teeth having curved cutting-edge portions separating the straight cutting-edge portions and located in substantial alignment with the curved cutting-edge portions of the said one set of the teeth; the curved cutting-edge portions of the teeth progressively increasing in length with respect to sequential engagement of the work by the teeth.

FRANCIS J. LAPOINTE.